United States Patent [19]
Savage et al.

[11] Patent Number: 6,045,660
[45] Date of Patent: Apr. 4, 2000

[54] MECHANICALLY ASSISTED TWO-PHASE CONTACTOR AND FUEL ETHANOL PRODUCTION SYSTEM

[76] Inventors: Kern Savage, P.O. Box 325, Albion, Calif. 95410; Richard C. Wingerson, 207 3rd St., Crested Butte, Colo. 81224; William Lee Woodie, P.O. Box 1453, Inyo-Kern, Calif. 93527; John L. Wyatt, deceased, late of Black Canyon City, Ariz.; by Diana Jacobs, legal representative, 5255 White Tail, Paso Robles, Calif. 93446; by Melody Balport, legal representative, 2220 Arborwood Way, Las Vegas, Nev. 89122-1617; by Mark Wyatt, legal representative, 1230 C. Del Monte, Monterey, Calif. 93940

[21] Appl. No.: 08/806,248

[22] Filed: Feb. 21, 1997

Related U.S. Application Data

[60] Provisional application No. 60/013,040, Mar. 8, 1996.

[51] Int. Cl.[7] ............................................. B01D 3/08
[52] U.S. Cl. ........................... 202/172; 202/173; 203/90; 261/89; 261/90; 435/161
[58] Field of Search ................................. 202/172, 173, 202/175; 203/90; 435/161, 162; 261/89, 90

[56] References Cited

U.S. PATENT DOCUMENTS

| | | |
|---|---|---|
| 621,166 | 3/1899 | Smith . |
| 2,941,872 | 6/1960 | Pilo ............................................. 23/270.5 |
| 3,486,743 | 12/1969 | Todd ............................................... 261/83 |
| 3,809,375 | 5/1974 | Bonnet ........................................... 261/90 |
| 4,198,360 | 4/1980 | Shafranovsky et al. ...................... 261/90 |
| 4,283,255 | 8/1981 | Ramshaw et al. ............................ 203/49 |
| 4,382,045 | 5/1983 | Wem ............................................. 261/89 |
| 4,382,900 | 5/1983 | Wem ............................................. 261/89 |
| 4,479,816 | 10/1984 | Ganter .......................................... 261/90 |
| 4,597,835 | 7/1986 | Moss ............................................ 203/89 |
| 4,627,890 | 12/1986 | Porter et al. ................................ 202/235 |
| 4,683,026 | 7/1987 | Feres ........................................... 159/6.1 |
| 4,692,283 | 9/1987 | Wem et al. .................................. 261/89 |
| 4,707,220 | 11/1987 | Feres ........................................... 159/6.1 |
| 4,731,159 | 3/1988 | Porter et al. ................................ 159/6.1 |
| 5,045,155 | 9/1991 | Ramsland ................................... 202/174 |
| 5,254,219 | 10/1993 | Feres ........................................... 159/6.1 |

Primary Examiner—Timothy McMahon
Attorney, Agent, or Firm—Wagner Middlebrook & Kimbell

[57] ABSTRACT

Apparatus for use in the rectification of liquid mixtures (separation of liquid mixtures into their constituents) and other processes requiring equilibration of liquid and gaseous phases in which mechanical energy is used to create and repeatedly regenerate free flying liquid structures that facilitate the intimate interaction and equilibration of said phases beyond standard practice and thereby allow smaller, more compact, more efficient, and more accessible apparatus and make practical lower operating temperatures and the use of inert carrier gases and otherwise increase the engineering options available to designers of rectification equipment and other equipment requiring liquid/vapor equilibration.

47 Claims, 7 Drawing Sheets

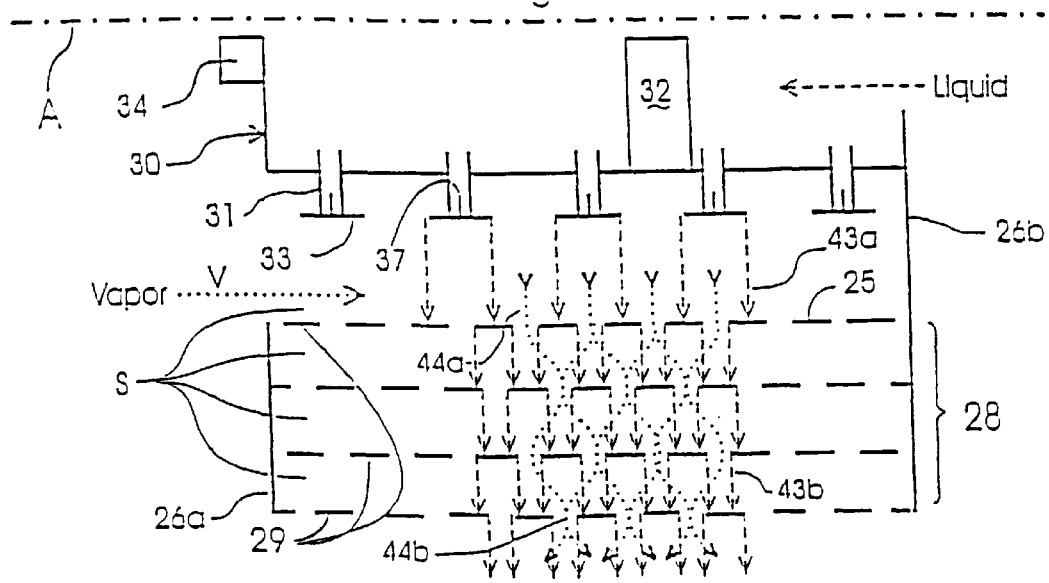
Fig. 3
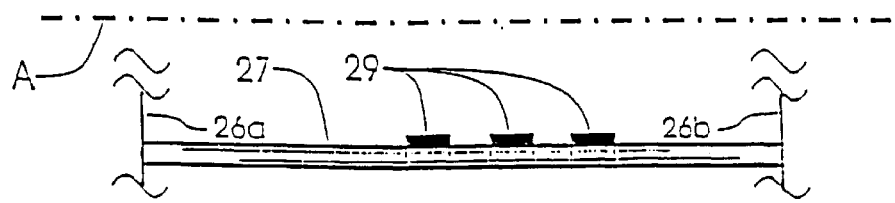
Fig. 3a
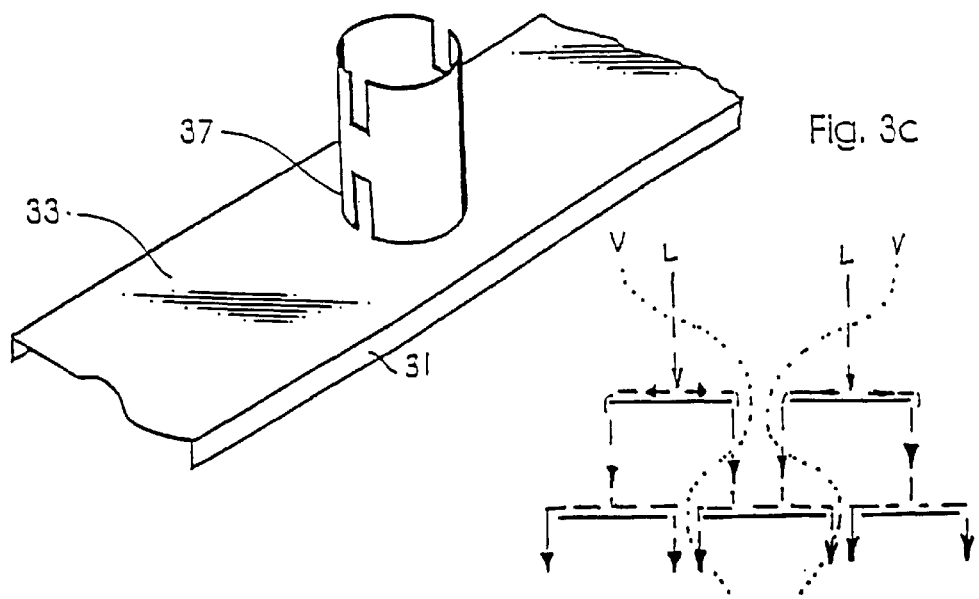
Fig. 3b
Fig. 3c

MECHANICALLY ASSISTED TWO-PHASE CONTACTOR AND FUEL ETHANOL PRODUCTION SYSTEM

REFERENCE TO RELATED APPLICATION

This application is a non provisional application based upon and claims benefit of U.S. Provisional Application No. 60/013,040 filed Mar. 8, 1996.

BACKGROUND OF THE INVENTION

This invention relates to apparatus for two phase equilibration and more particularly for equilibration of liquid and gaseous phases with application (among others) in the rectification of liquid mixtures, in the scrubbing of gases, in the evaporation of liquids, and in the condensation of vapors to the liquid state.

PRIOR ART

The rectification of liquid mixtures (separation of liquid mixtures into their constituents) is a common operation in industrial chemistry. Heretofore rectification has been carried out by such processes as distillation, extraction, and absorption either alone or in combination. A key aspect of efficient rectification is the equilibration of two phases. In the case of multiple contact distillation columns (stills), liquid and gaseous (vapor) phases must be repeatedly contacted and equilibrated in counterflow stages. The rate of equilibration between liquid and gaseous phases is limited by diffusion and mixing within both phases near their interface. A limited rate then requires a larger contact area and/or longer contact time which in turn, leads to larger equipment sizes and/or lower throughput with consequent economic penalties. These problems are exacerbated by lower operating temperatures and/or the presence of an inert carrier gas that interferes with diffusion through masking.

Conventional stills are generally constructed as tall, stationary columns. These may contain a packing with large surface area designed to promote intimate vapor/liquid contact between vapor ascending the column and condensed liquid running back down the column.

Alternatively, they may be provided with a number of horizontal trays or plates (stages) provided with so-called bubble caps or similar arrangements designed to promote good contact between liquid on the tray or plate and vapor passing up the column. In recent years, a combination has become popular in which trays are filled with packing.

If the components to be separated have boiling points that are close to one another, a very tall column (sometimes in excess of 50 meters high) or a number of smaller columns may have to be used.

In standard practice, the motive power for the mixing of phases to promote interaction and achieve equilibration is provided by the pressurized flow of the gaseous phase and by the gravitational flow of the liquid phase, and many designs have been developed to utilize this motive power most efficiently to maximize the rate of equilibration and hence to minimize equipment size and cost. A fundamental limitation of this standard practice is that if the flow velocity of either the gaseous or liquid phase be increased to improve the quality of interaction then the contact time available for equilibration must necessarily be decreased with a consequent decrease in performance that may largely negate the gains from improved interaction quality.

Equipment designers are severely constrained by this trade-off, with implications for equipment performance and cost. Every chemical engineer understands that distillation (or rectification in chemical engineering language) is often accomplished using many stages (or plates) in a series with liquid and vapor in counter-flow. In each stage the vapor and liquid interact so that they leave the stage more closely in equilibrium than when they entered. The entire system is powered by heating one end (the bottom of the stripper) and cooling the other end (the condenser). The purpose of the heating is to create vapor by boiling, while the purpose of the cooling is to condense the distillate such as ethanol or other product. The most conventional apparatus consists of one or more towers containing many plates or trays (stages) designed to bring liquid and vapor into close contact. Liquid flows downward under gravity while vapor is forced upward from the pressure generated by boiling. In recent decades, and especially in the last few years, energy efficiency has been increasingly emphasized in plant design. Numerous designs of column plates and energy conservation schemes have been tried with varying degrees of success.

Numerous inventors have attempted to improve on standard practice by mechanical rotation of apparatus. In such rotating apparatus, centrifugal force takes the place of gravity or applied fluid pressure to motivate liquid flow; and, since rotation can be at any reasonable speed, the equipment designer can choose the speed that gives the best performance rather than being confined to a single force of gravity. Rotating apparatus has the additional advantage that it can be made much more compact than gravity or pressure driven apparatus.

U.S. patents that include mechanical rotation to facilitate mass transfer and equilibration between liquid and vapor phases include:

| Ramshlow et al. | 4,283,255 | Aug. 11, 1981 |
|---|---|---|
|  | 5,045,155 | Sept. 3, 1991 |
| Moss | 4,597,835 | July 1, 1986 |
| Porter et al. | 4,627,890 | Dec. 9, 1986 |
|  | 4,731,159 | Mar. 15, 1988 |
| Feres | 4,683,026 | July 28, 1987 |
|  | 4,707,220 | Nov. 17, 1987 |
|  | 5,254,219 | Oct. 19, 1993 |
| Wem | 4,692,283 | Sept. 8, 1987 |
|  | 4,382,900 | May 10, 1983 |
|  | 4,382,045 | May 3, 1983 |
| Todd | 3,486,743 | Dec. 30, 1969 |
| Pilo | 2,941,872 | June 21, 1960 |
| Smith | 621,166 | Mar. 14, 1899 |

Without exception, these patents emphasize the contact between vapor and a film of liquid flowing under centrifugal force over a solid surface. None of these inventions, to the applicants' knowledge, has seen widespread adoption. The problem is that while centrifugal force thins and stirs the liquid film thereby improving the contact between liquid and vapor, it also reduces the time of contact. Such systems also are subject to the problem of flooding by the liquid. Thus there is little or no improvement in performance over standard practice except for reduction in equipment size, and this size reduction is only obtained through increased complexity. Furthermore, since liquid and vapor are in counter-flow (as is standard practice) all of these assemblies are subject to flooding if liquid flow increases a small amount above optimal performance.

Faced with this state of the art, we have sought to produce a system including a rotating contactor which avoids all of the foregoing limitations and which is able to provide mechanical means as the motive power to promote mass transfer and interphase equilibration in two phase separation equipment beyond that achievable in standard practice and thereby:

1) circumvent the mixing/contact-time tradeoff limitation;
2) circumvent the problem of flooding;
3) make practical lower operating temperatures and the use of inert carrier gases;
4) make practical heat transfer to or from individual contactor stages;
5) reduce equipment size and energy consumption;
6) greatly increase the options and performance trade-offs available to equipment designers;
7) facilitate the recuperation and reuse of heat in distillation;
8) make practical the harnessing of fermentation heat in ethanol distillation;
9) make advantageous the use of the highest fermentation temperatures tolerable to the fermenting agents; and
10) ultimately to improve performance, reduce energy consumption, and reduce cost of equipment for distillation, gas scrubbing, evaporation, condensation, and other processes requiring liquid/vapor equilibration.

The foundation of our new systems on which everything else rests is our new contactor stage. Conventional stages or plates simply do not work well when there is an inert third component in the vapor beyond the prime distillate such as ethanol and water. What we have done is to take advantage of the unique capability of our contactor stage in designs aimed toward the same major goal, namely, reduction of overall energy consumption. We need to always bear in mind that the amount of vapor needed by the stripper stage and the amount of cooling needed to condense the product are pretty well fixed per gallon of product. The objective is to avoid paying the full price for this energy flow in terms of raw energy input. We want to recycle as much of the energy as is economically practical, and there is no obvious limit to this possibility.

Readers will find further objects and advantages of our invention from a consideration of the ensuing description and the accompanying drawings.

BRIEF DESCRIPTION OF THE DRAWINGS

FIG. 3 is an enlarged detail of the hub portion of FIG. 2 with a schematic representation of liquid and vapor flow paths;

FIG. 3a is a simplified partial longitudinal sectional view of one of the nested cylindrical remixers of the remixing section of the contactor assembly of FIG. 3;

FIG. 3b is a fragmentary perspective view of the liquid distribution tubes and bands of FIG. 3;

FIG. 3c is an enlarged fragmentary sectional view of the interstage;

BRIEF SUMMARY OF THE INVENTION

The most fundamental aspect of our invention is the application of a physical phenomena whose potential has not heretofore been recognized.

In the formation and separation of a drop of liquid, new liquid surface is created at a high rate, and a violent stirring of liquid is induced within the drop with the consequence that mass transfer and equilibration between liquid and vapor phases is greatly enhanced over that achievable when the liquid forms a film on a solid surface or even over that achievable when a drop is in prolonged contact with vapor. Details of this phenomenon have been reported in the research literature and summarized by Sherwood et al ("Mass Transfer", McGraw-Hill, 1975, p231). This enhanced equilibration dies out very quickly as the drop flies free and liquid viscosity suppresses internal circulation. In our invention, free flying liquid structures (collectively referred to as drops) are repeatedly formed, launched, contacted with vapor, recollected, remixed, reformed and relaunched so that the liquid spends much of its time in the highly active state of drop formation and separation.

This new approach to liquid/vapor equilibration has been reduced to practice in a contactor stage as a departure from a single plate or tray in a conventional distillation column with elements that first achieve the necessary repeated liquid/vapor active contacts and then remove from the vapor any residual mist or entrained droplets resulting from the violent agitation. This emphasis on the transient formation and separation of free flying liquid structures in a mechanically rotated contactor element distinguishes our invention from all prior art.

As is the case with standard practice, a single stage seldom has useful application. Multiple stages must usually be combined to produce units for application in distillation, vapor scrubbing, evaporation, condensation, and other processes requiring liquid-vapor contact and equilibration. In the following "Detailed Description of the Invention", a single contactor stage will first be described followed by a description of a multiple-stage unit. Said units may then be used alone or in combination as required for particular applications. Finally, one preferred application, a new distillation system for ethanol is described that employs our contactor and demonstrates the practical value of our invention.

Detailed Description of the Invention

Figure 1:
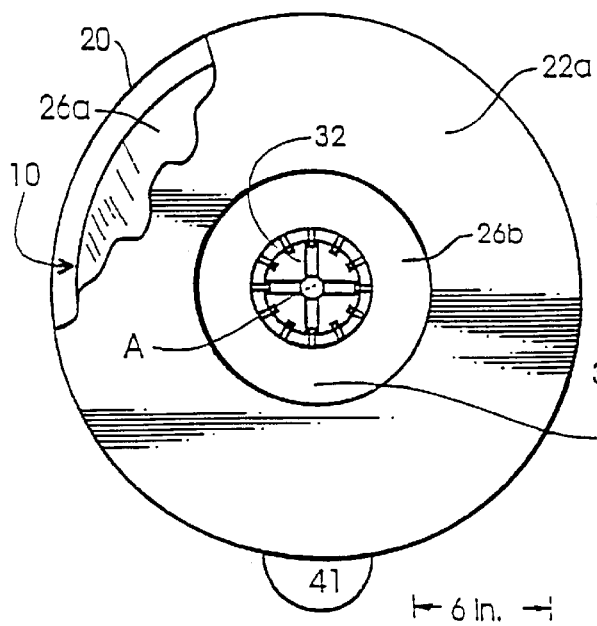
FIG. 1 is an end view of a single contactor stage.
Figure 2:
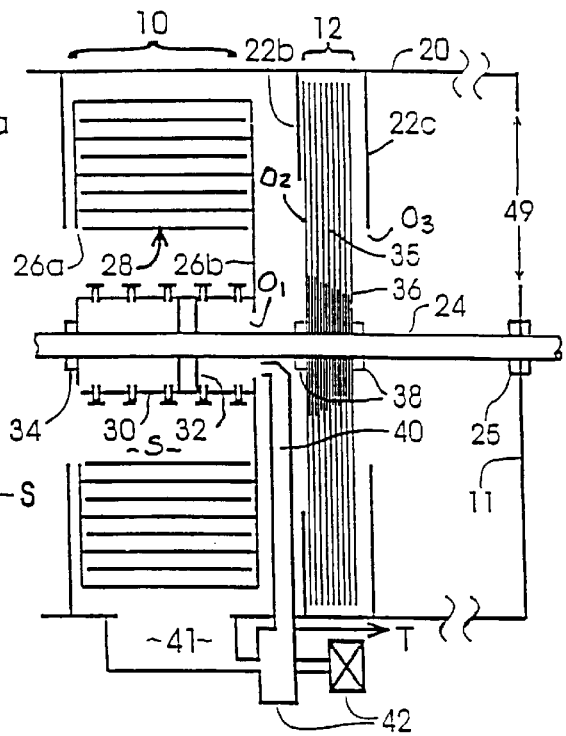
FIG. 2 is a longitudinal axial section of the single contactor stage of FIG. 1.

FIG. 1 is an end view of a single contactor stage with FIG. 2 being a vertical section through the axis A. FIG. 3 is a detail of the hub shown in FIG. 2. A scale is provided in FIGS. 1 and 2 to illustrate dimensions for one particular embodiment. Performance is not degraded significantly by modest dimensional changes; but in scaling to significantly larger or smaller sizes, optimal performance requires adjustment of proportions.

The contactor assembly 10, is housed within a cylindrical vessel 20 having an axis A and providing structural support and containment for liquid and vapor. In a finished single or multiple-stage unit, hereinafter called a contactor unit, end plates 11 complete the enclosure 20 and provide support for bearings 25 for drive shaft 24 and other components that may be needed. Annular bulkheads 22a–c provide separation between stages and between contactor assembly 10 and a demister section 12 of a single stage. In a multiple-stage assembly, bulkhead 22c would correspond to bulkhead 22a in the adjoining stage.

Drive shaft 24 provides support and rotational motion to the contactor and demister assemblies 10 and 12, respectively. One annular side wall 26b of the contactor assembly 10 is attached to a cylindrical hub 30 to provide a longitudinal vapor passage V of FIG. 3 with vapor entry from the left around the hub 30 and denoted by the dotted line. The vapor expands radially outward through a plurality of remixing cylinders 28, radially inward to the left of bulkhead 22b, and finally through the screens 35 of the demister assembly 12. This path is shown in the drawing by a dotted line to denote vapor travel.

The remixing cylinders 28 in the embodiment shown include a plurality of tubular bands 29, best seen in FIG. 3a. Typically, the bands 29, in the embodiments, are of ¾ inch width and longitudinal spacing of ½ inch. The edges of each band 29 have small, outward directed lips 29L to provide controlled release of drops of liquid with the vapor path V necessarily crossing the fluid drops at each band. The bands 29 of each cylinder are attached to a plurality of elongated rods 27 to tie the separate bands 29 in position and to fasten the remixing cylinders 28 between the annular contactor walls 26a, b. A plurality of co-axial remixing cylinders 28 are spaced ¾ inch in the radial direction, with the openings and bands of successive cylinders 28 staggered to insure the interruption and remixing of radial liquid flows.

As shown in FIG. 3a, attachment between contactor walls 26, rods 27, and bands 29 by welding or other means must be adequate to insure rigidity of the entire contactor assembly 10 and to withstand centrifugal forces and startup torques.

FIG. 3c illustrates the repeated interaction between the vapor flow V and liquid L. The liquid L and vapor V coflow but repeatedly interact at each transition from band to band.

The hub 30 of FIGS. 1 and 3 serves both to attach the contactor assembly 10 rigidly to the drive shaft 24 and to distribute liquid flows uniformly over the remixing cylinders 28. A collar 34 of FIGS. 2 and 3 has one or more setscrews and/or a keyway or other means, unshown, as necessary, to provide secure attachment to shaft 24. A spider 32 with a slip fit over the drive shaft 24 stabilizes the contactor assembly 10. Uniform liquid flow is obtained by short tubes 31 penetrating the cylindrical outer hub wall 30a and notched on the inside of the hub 30 to create wiers 31a feeding the tubes 31 as shown in FIG. 3b. On the outside of the hub 30, the tubes 31 are also notched at 37 and covered with bands 33 so that liquid is projected circumferentially on the inner surface of the bands 33 and thereby spreads uniformly before flowing off the edges of the bands 33. The edges of these bands 33 are aligned with the centers of the bands 29 of the innermost remixing cylinders 28 as shown in FIG. 3.

Fundamental to this invention is the arrangement illustrated in FIGS. 3, 3a, 3b and 3c in which fresh drops of liquid are formed, first at the edges of the bands 33 and flung outward to impact upon the bands 29. The impacting liquid flows to the edges of the bands 29, form new drops at each edge and are flung outward to impact upon the next staggered band 29 and the same sequence is repeated. New drops are formed with each impact thereby providing fresh surface of liquid as well as thorough mixing of the liquid at each impact. We have found that this repeated formation of fresh drops by the bands 33 and 29 enhances the mixing with incoming vapor. We contrast with this process of forming a drop and passing that drop through an elongated vapor filled passage V where we have noted the migration of the vapor into the liquid proceeds rapidly at first but then drops off remarkably as the drop continues. There may be several explanations for such dying out of the drop's capability to absorb more vapor. Suffice it to say, we avoid that problem by the continuous formation of new drops from the central inlet to the sump.

Figure 2A:
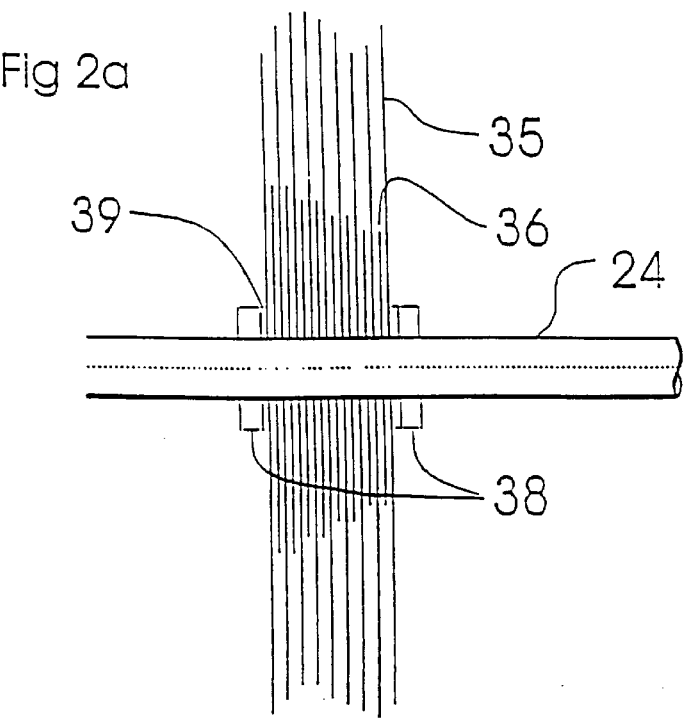
FIG. 2a is a simplified longitudinal partial sectional view of the contactor assembly of FIGS. 1 and 2.

The demisting assembly 12 best seen in FIGS. 2 and 2a consists of spacers 36 separating a plurality of screens 35 of 20 to 30 mesh and held to the drive shaft 24 by locking collars 38 that include a compression feature such as lock washer 39 or through bolts to compress and retain the spacers 36 and screens 35. The demisting assembly 12 rotates with shaft 24. It serves to remove small liquid drops (mist) entrained with the flowing vapor.

At the bottom of the contactor vessel 20 is a sump 41 from which liquid is recirculated by a motor driven pump 42 through a pipe 40 and injected into the hub 34.

Figure 4:
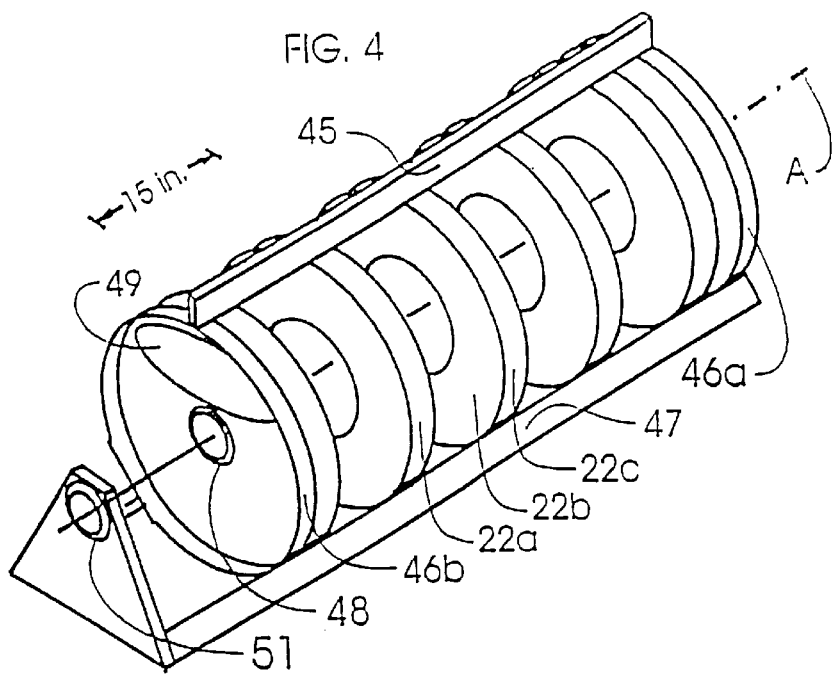
FIG. 4 is a simplified perspective representation of a multiple stage contactor unit.

In a multi-stage contactor unit as shown in FIG. 4, some of the recirculating liquid must be diverted to an adjacent stage to provide for a net liquid throughput. This diversion may be achieved by a tap T of FIG. 2 from the pressure side of the pump 42. The diversion may be in either direction to provide net co-flow or counter-flow as the particular application may require.

For a single stage contactor, a hollow central shaft may provide for liquid feed, but single stage contactors are not preferred. We have found that in multi-stage contactors it is impractical to utilize a hollow central shaft 24 for liquid distribution and maintenance is difficult. Therefore we favor the use of the solid shaft 24 and hollow liquid distribution hub 30.

The non-rotating parts of a multi-stage contactor unit are shown schematically in FIG. 4. Bulkheads 22, sump 41, flanged end plates 46a, 46b with bearings and various fittings are rigidly attached to an axially directed support structure whose upper surface is about 1 foot in width with curvature corresponding to the cylindrical stage wall. This support structure is strengthened by rail flanges 47 which extend beyond the end plate to provide support for a stabilizer bearing 51 and a rotational drive mechanism such as an electric motor (not shown). The top edges of end plates and bulkheads are tied to and stabilized by an axially directed, rail flange 45.

Figure 5:
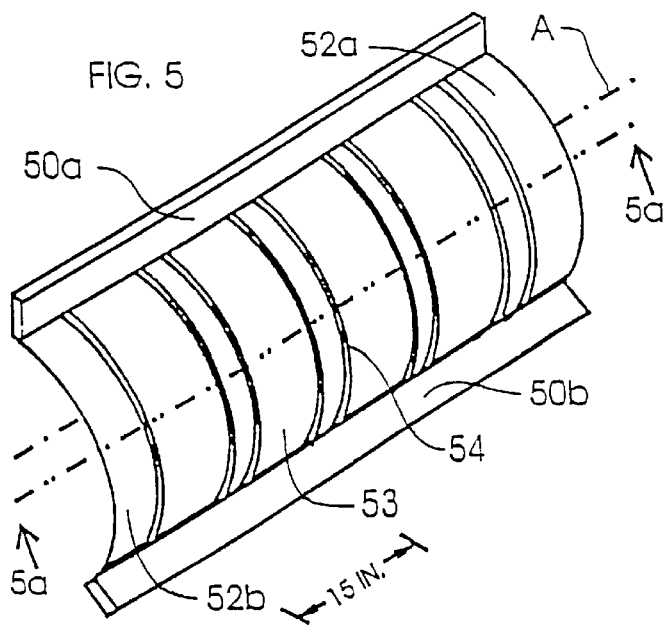
FIG. 5 shows a removable cover for the multiple stage unit of FIG. 4.

The cylindrically curved side walls or covers for the contactor unit as shown in FIG. 5 are removable to provide easy access for assembly and maintenance and are provided with elastomeric seals along all edges and at the bulkheads. Ribs 54 formed in the cover material add rigidity, provide seats for the bulkhead seals, and stabilize the bulkheads against longitudinal dislocation. Orifices 49 and attachment points are provided for connecting ductwork to the end plates. Inside the end plates, plenum space is provided to connect and smooth the vapor flow between vapor ducts and contactor stages.

Figure 5A:
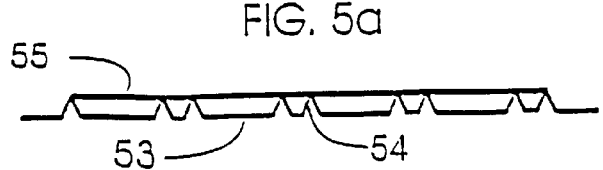
FIG. 5a is a longitudinal sectional view taken along line 5a of FIG. 5.

When the outer wall 55 of the contactor 10 is fabricated as a double wall as illustrated in FIG. 5a, the double wall passages may be used to contain liquid films and associated vapor that may be used for heat transfer purposes. The inner wall 53 with its formed ribs 54 bonded to the outer wall 55 at the tops of the ribs 54. An extension of the main support beam 47 of FIG. 4 provides support for a mechanism to rotate the contactor assembly 10 and demisting screen assembly 12. Flanges 52a,b mate with flanges 46a,b. Flanges 50a,b mate with flanges 45 and 47. All of these flanges must be provided with suitable clamping or bolting features to properly compress elastomeric seals.

Flooding, a common problem with rotating contactors, is avoided in our invention since the vapor and liquid flow in the same direction through the contactor element. Flooding occurs in conventional contactors when liquid and vapor are forced to move in opposite directions through narrow passageways. When the vapor flow is too high the vapor blows the liquid along with it and blocks the liquid flow. Alternatively channeling may occur in which liquid flow concentrates in some passageways while vapor flow concentrates in others. This seriously degrades the effectiveness of the vapor/liquid contact. In our invention the liquid and vapor are in co-flow in the regions of interaction, namely in the remixers 28.

Single, multi-stage contactor units are often suitable for such applications as gas scrubbing, evaporation, and condensation. Rectification requires a plurality of units serving different function. The high efficiency of our contactor in promoting equilibration of vapor and liquid as described above allows the design of distillation apparatus and a new distillation process in an overall system employing our contactors and incorporating a recirculating vapor component not heretofore considered practical.

Contactor—Operation

The most unique feature of our improved contactor assembly is the use of mechanical power to achieve intimate contact between recirculating liquid and vapor phases and, in particular, repeatedly to form and launch free flying liquid structures with fresh surface and active internal circulation to be swept by moving vapor, thereby enhancing the rate of mass transfer and equilibration. In addition, the recirculation of liquid independent of net liquid and vapor throughputs provides an additional design option especially useful when heat transfer or additional liquid/vapor surface area or contact time is needed.

A single contactor has the role of a single plate or stage in conventional practice. Because the liquid and vapor flows within a single contactor are in co-flow, as described above, flooding in the usual sense is impossible. The contact between phases achieved in our new contactor is so effective that equilibration can be achieved even in the presence of an inert vapor component that would seriously degrade the performance of conventional contactors, an effect called masking. In fact, it is generally considered that such operations as distillation and condensation are impractical if an inert component is present in significant amount.

In the contactor shown in FIGS. 1 to 3, liquid is pumped to the hub 30 of a rotating wheel from which it is emitted in a uniform pattern along the length and circumference of said hub 30. The hub is surrounded by a plurality of remixing cylinders 28 spaced appropriately to optimize overall mass transfer. These remixing cylinders 28 are preferable constructed of bands as previously described to serve the following purpose: liquid emitted as drops (free flying liquid structures) from the hub 30 by centrifugal force contacts moving vapor in the free space and then is collected for re-emission in passing through the first remixing cylinder 18. The liquid is re-emitted as drops with fresh, active surface by centrifugal force from this first remixing surface and again contacts vapor in the free space. This process is repeated through all the remixing cylinders until the drops strike the stage outer wall or enclosure 20 with tangential velocity that promotes heat transfer, if desired. Heating or cooling of the outer wall 20 can then be used to induce evaporation or condensation of liquid as may be required in various zones of a multiple contactor rectification plant or in other applications.

The remixing cylinders 28 can be fabricated in patterns other than bands 33 so long as the radial flow of liquid is repeatedly interrupted and drops with fresh surface are repeatedly regenerated.

Liquid from the annular bulkhead or stage wall 22 is collected in sump 41 for recirculation back to the hub 30 via pipe 40. In addition to and independent from the recirculation of liquid, there will be a net flow of liquid into and out of the stage.

Because liquid recirculation in a stage is independent of the net liquid throughput for the stage, liquid residence time and surface area (and hence opportunity for equilibration) is made independent of the vigor of liquid/vapor contact.

Contactor 10 rotation and centrifugal force are used only to create a uniform pattern of liquid flow and not to create thin liquid films as is usual practice in rotating contactors. Therefore, much lower rotational speeds (a few hundred RPM) can be used with consequent savings in energy consumption as well as avoiding problems with vibration and mechanical stress.

Vapor in path V is introduced at small over pressure through an opening S of FIGS. 1 and 2 in a bulkhead or stage wall 22a into the spaces immediately surrounding the hub 30 where it begins a radial outward flow and where it contacts active liquid repeatedly in its passage through the remixing cylinders 28. Mass transfer and equilibration between phases is induced primarily by the motion of the vapor over the forming and newly formed liquid drops D of FIG. 3 spun from the remixing cylinders 28. Some additional equilibration comes from contact between vapor and films of liquid on the remixing cylinders 28 and between vapor and the film of liquid thrown to the outer stage wall 20 of FIGS. 1 and 2. After mixing and equilibration, the vapor V flows through an opening, $O_1$ and then opening $O_2$ (FIG. 2), in an intermediate bulkhead 22b and through the demister assembly 12 comprising a plurality of rotating screens to remove any liquid droplets (mist) that might be entrained from the intense prior mixing and whose continued presence would adversely affect stage performance. Provision is made to drain the liquid collected in the demisting assembly back to the stage sump 41.

Finally, the vapor V exits the stage through an opening $O_3$ (FIG. 2) in a stage wall bulkhead 22c and $O_3$ into the next stage where the actions just described are repeated. Because of the openness of the banded contacting structure 28, resistance to vapor flow is greatly reduced below conventional practice with consequent savings in energy consumption.

Although liquid and vapor in a single stage are in co-flow, they will most often be in counter-flow from stage to stage. One exception to this rule is when a contactor unit is used as a condenser, in which case, co-flow will usually be most appropriate.

A multi-stage contactor unit will enhance and magnify the performance of a single stage as described above. In an application for evaporation, vapor and liquid will usually be in counter-flow, and wall heating may be used. For condensation, co-flow will usually be best, and wall cooling will be needed. For vapor scrubbing, liquid and vapor will be in counter-flow, some cooling may be needed, and chemicals may be added to the liquid feed to enhance performance.

When our contactor units are used for rectification, multicomponent vapor and liquid in net counterflow through the contactor will undergo a change in composition similar to that which occurs in a partial length of a standard distillation column. A plurality of contactor units 10 can be combined into a rectification plant in much the same fashion that distillation columns can be built with length sufficient to provide the number of equivalent equilibrium stages required for a desired degree of separation of liquid components.

Figure 8:
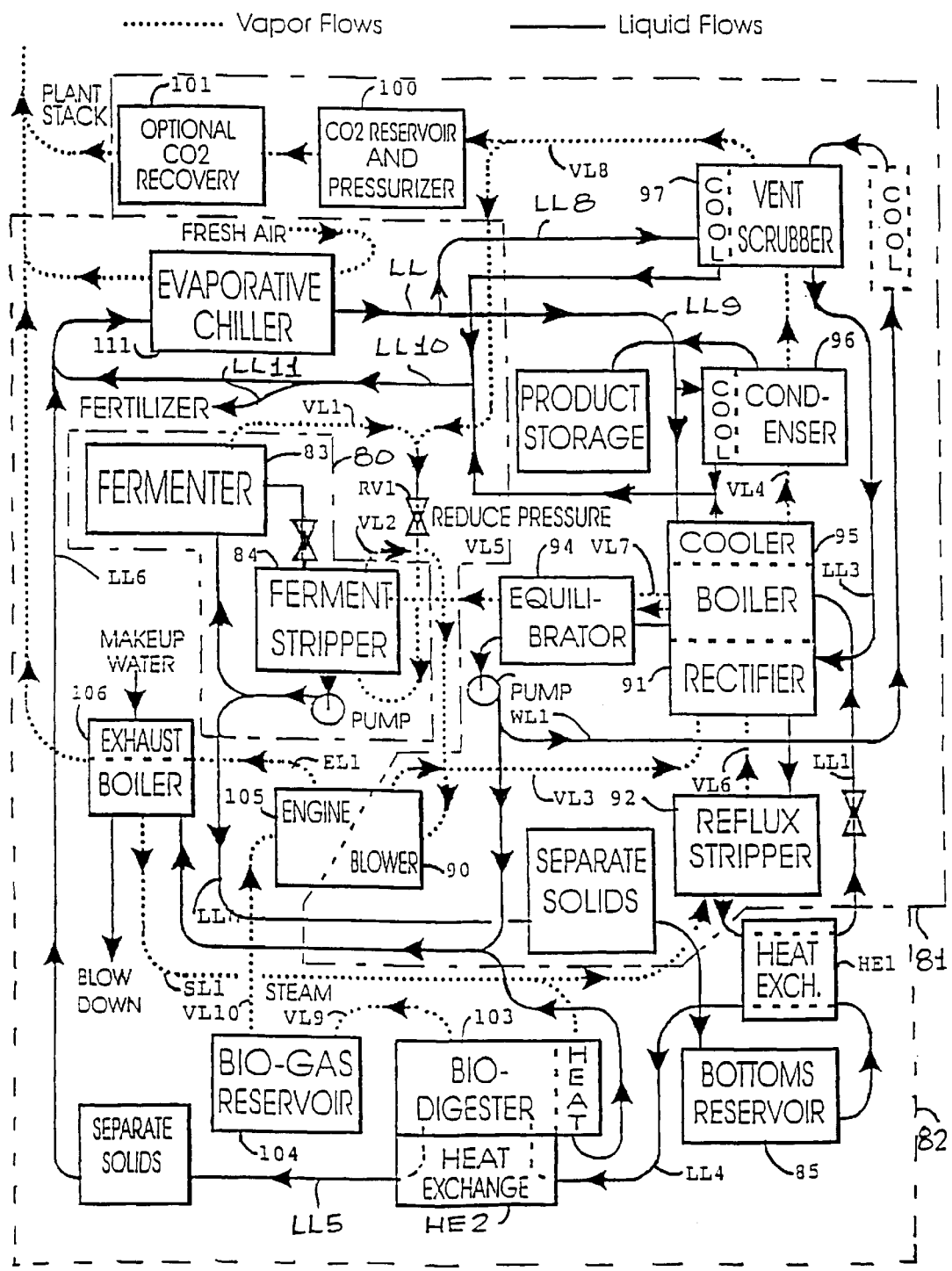
FIG. 8 is a schematic diagram of a practical ethanol distillation facility using our new apparatus and process.

In an unconventional still design requiring numerous contactor units, individual contactor units may be operating in a variety of modes (co-flow, counter-flow, heat in, heat out, and adiabatic) in order to optimize still performance. This versatility is a major advantage of our invention which we have used to create a new process for fuel ethanol production as shown in FIG. 8.

A Distillation System Employing Our New Contactor

Figure 6:
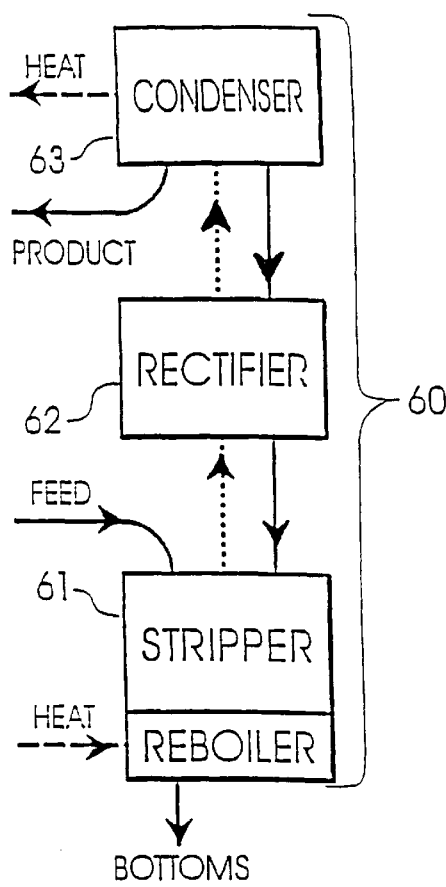
FIG. 6 shows an idealized and simplified schematic drawing of a conventional still.
Figure 7:
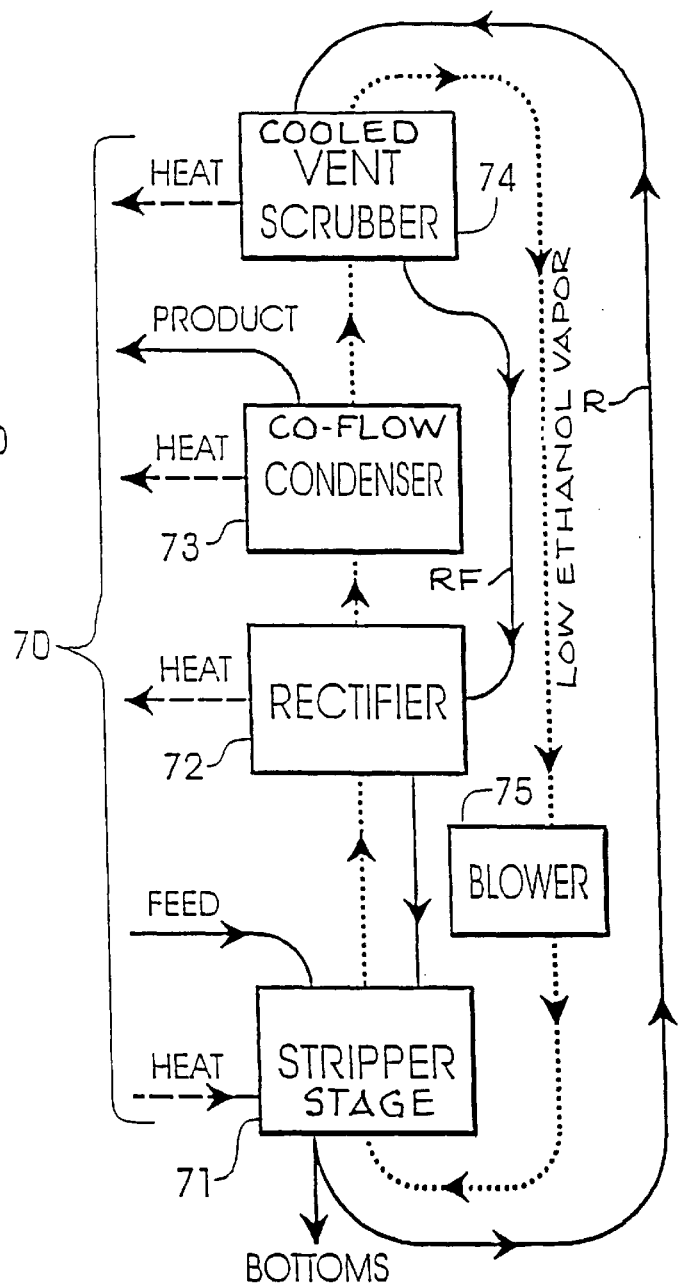
FIG. 7 shows an idealized and simplified schematic drawing of our new distillation process with recirculating vapor.

To better understand how our new still differs from standard practice, the reader should refer to FIG. 6 and FIG. 7 wherein are shown idealized schematics of a conventional still and of our new still with recirculating vapor. Conventional practice (FIG. 6) is to use an insulated (adiabatic) distillation column 60 with stripper stages 61 below the FEED input and rectifier stages 62 above the FEED input. A condenser 63 at the top removes heat and recovers product from the upward vapor flow, denoted by the dotted lines with a portion of the product returned to the rectifier 62 as reflux shown as a solid line and arrowhead. A heated reboiler at the bottom of the stripper 61 generates and powers the vapor flow with part of the reboiler liquid discharged as waste or "bottoms". Each location in the still operates at the boiling temperature characteristic of the liquid composition at that location. A change in operating temperature can only be obtained by changing operating pressure. The presence of an inert vapor component in significant amounts will seriously degrade the performance of a conventional still, and provision must often be made to bleed off such material with an accompanying loss of product.

Our Inventive System

The most important characteristic of our still 70 with recirculating inert vapor component of FIG. 7 is that local temperatures can be less than the local boiling temperature. The presence of an inert vapor component essentially allows evaporation without boiling. This means that temperature sensitive materials can be distilled without necessarily resorting to vacuum. With reference to FIG. 7, most of the stages in the stripper stage 71 and in the lower part of the rectifier 72 are operated under adiabatic conditions. The co-flow condenser 73 removes heat and recovers product from the upward vapor flow, but reflux for the rectifier 72 is formed within the rectifier 72 itself by removal of heat from the upper rectifier stages. Some product may sometimes be needed as reflux to the top of the rectifier to stabilize operation or to distribute the cooling load.

Condensation to product is incomplete, but the residual ethanol in the vapor is mostly removed by a cooled vent scrubber 74. The liquid from the bottom of the scrubber 74 is refluxed to a stage of the rectifier 72 with the nearest matching ethanol concentration (usually near the middle). Vapor with low ethanol content from the top of the vent scrubber 74 is recirculated by a mechanical blower 75 to the bottom of the stripper unit 71 where the first few stages act as an adiabatic evaporative cooler for the bottoms and create some of the vapor conventionally generated by a reboiler. A portion of the cooled, low ethanol bottoms is recirculated to the top of the cooled vent scrubber 74 as reflux over line R. In the stripper unit 71, heat input is provided to a few stages just above the evaporative cooling part to complete the heat input and vapor generation conventionally provided by a reboiler.

While the idealized recirculating still 70 shown in FIG. 7 may be used in some applications (such as for high value, temperature sensitive products), it is not preferred to be applied to the production of fuel ethanol from fermented mash. Recirculation of mash laden bottoms to the top of the scrubber 74 would tend to foul the entire system, and energy requirements are high without means for recuperation and reuse of energy. These limitations can be overcome by the system shown schematically in FIG. 8.

The System and Process of FIG. 8

Our process for production of fuel ethanol from a high starch feed stock such as cassava is shown schematically in FIG. 8. This system and process as shown in FIG. 8 is subdivided into three logical modules: the fermentation module, 80, the distillation module 81, and the process energy module 82. There are a number of units in this process that employ the contactor assembly 10 of FIGS. 1–5 for liquid/vapor equilibration and illustrate the variety of operations to which said contactor 10 can be effectively applied. Note that in conventional distillation practice as illustrated in FIG. 6 employing multi-stage columns, liquid flows from top to bottom while vapor generally flows from bottom to top. For consistency and convenience in discussion, this terminology of "top" and "bottom" will be used throughout the following description even though the physical arrangement of our contactor 10 stages may be horizontal rather than vertical.

For comparison, first consider current practice. A feed-stock is normally processed and diluted as necessary to provide a sugar solution of at most 20% by weight. This solution is then fermented until the sugar is consumed (yielding 10% ethanol), and the resulting dilute ethanol solution is then clarified and fed to a still. In this conventional process the initial sugar concentration is limited by the poisoning of the yeast from the final ethanol concentration, and provision must be made to cool the fermenter else the temperature would rise and kill the yeast.

The Fermenter Module 80

Contrast this conventional practice with our process shown in the attached drawing FIG. 8. In our system and process, a fermenter 83 and a ferment stripper 84 are integrated into the fermenter module 80 to achieve several distinct advantages over conventional practice. During fermentation, the mash is circulated through the ferment stripper 84 to remove ethanol as it is produced. This allows initial sugar concentration to be as high as 30% such as might be obtained from saccharification of a high starch feedstock or from sugar cane molasses. Use of a 30% solution rather than a 20% solution results in a fermentation vat two thirds the size with attendant capital cost savings, but that is only the beginning. By maintaining a low ethanol concentration throughout the fermentation cycle, poisoning of the yeast is avoided, thereby speeding fermentation, reducing turnaround time for the fermenter 83, and thereby reducing capital costs for vats by up to an additional factor of eight. In addition, the reduction of stress on the yeast from ethanol poisoning, permits higher fermentation temperature (also stressful) and further speeds the fermentation process. Thus it can be seen that the linking of fermentation and stripping results in major reductions in the capital cost of fermentation over standard practice.

At the end of the fermentation cycle in our process when the sugar has been exhausted, the return flow from ferment stripper 84 to fermenter 83 is diverted via liquid line LL instead to a bottoms reservoir 85. This waste flow carries some ethanol since stripping is never complete. In our process, however, this ethanol loss is only a fraction of conventional practice since fermentation volume is greatly reduced and discharge occurs for only a fraction of the distillation period. Reducing losses of product increases profits.

The ferment stripper 84 is of a unique, energy efficient design employing our contactor 10. The key feature of this new stripper 84 design is an inversion of the stage-to-stage temperature profile from conventional practice. The bottom stage is the coldest stage C rather than the hottest stage H. This temperature inversion is accomplished through evaporative cooling by the recirculating vapor (our preferred embodiment) or by blower induced, stage to stage pressure differences or by a combination of these two mechanisms. The recirculation vapor follows a path through the control valve RV1 and through vapor ducts VL2, VL3, VL4 and VL8, finally returning to RV1 as shown in the drawing FIG. 8.

A flow of vapor consisting primarily of carbon dioxide is fed from the fermenter 83 over vapor line VL1 to the bottom of the ferment stripper 84. This flow is obtained as a combination of the vent gas from the fermenter 83 (thereby recovering the ethanol in this vapor) and from recirculation from a vent scrubber unit 97 to be described later. This inert vapor feed would be unthinkable in conventional practice since it would interfere seriously with liquid/vapor equilibration, a limitation which we have overcome by the contactor assembly 10. In the process, this inert vapor flow provides evaporative cooling of the liquid stream returning to the fermenter 83 while creating needed vapor in the ferment stripper 84 that is provided in conventional practice by a heated reboiler as in FIG. 6. This utilization of fermentation heat results both in significant savings of operating costs for energy and in elimination of capital costs for a conventional stripper heating and fermenter cooling apparatus.

An important feature of our new process for fuel ethanol production is the inversion of the temperature profile in the bottom few stages of the ferment stripper 84 handling the fermented material. It is this temperature inversion that makes possible the utilization of fermentation heat with a consequent improvement in distillation energy efficiency. In a standard boiling still, the bottom stage has the highest temperature since its composition has the highest water fraction and water has the highest boiling point. Stage temperatures then decrease with progress up the still as ethanol concentration increases. This temperature pattern is incompatible with the utilization of fermenter heat since such utilization requires that the temperature at the bottom or return flow to the fermenter be significantly less than the temperature at the stage where the feed stream from the fermenter enters the still.

In our new process, recirculating inert vapor interacts with the liquid flow in the ferment stripper 84 to provide a progressive evaporative cooling of the lower stages, thereby providing the desired temperature inversion. Alternatively, instead of recirculating inert vapor, mechanically driven blowers can be located between the lower stripper stages to provide progressively increasing pressure and hence increasing boiling temperatures to provide the temperature inversion.

For the previously discussed benefits to occur, the ferment stripper 84 must be operated at reduced pressure, typically in the range 100 to 130 mm mercury. At a pressure of 110 mm, temperatures throughout the ferment stripper 84 are in the range 30 to 50 degrees centigrade which yeast can well tolerate during their brief transit. At these low temperatures, denaturing of protein and other chemical and physical reactions leading to buildup of deposits in the ferment stripper 84 are largely avoided thereby minimizing maintenance costs.

The remaining special feature of our ferment stripper 84 is the vapor injection (typically at stage 4) to enhance stripping above the evaporative cooling stages. The injection vapor originates from the rectifier 91 of the distillation module 81, as discussed below. No other energy input, except for contactor 10 rotation, is required by the ferment stripper 84, and this unit should be well insulated. Throttling valves such as valve RV1 to reduce pressure of liquid and vapor fed to the ferment stripper 84 are needed as well as a PUMP P1 to return liquid to the fermenter 84.

While the schematic, FIG. 8 shows but a single fermenter 83, several would be used in practice with their cycles overlapping to provide a continuous and nearly uniform vapor feed to the distillation module 81.

The Distillation Module 81

FIG. 8 shows the main, vapor-fed distillation column 95 on the right. Virtually every piece of apparatus in our still differs in its operation from conventional practice. Vapor from the ferment strippers 84 is merged and fed via line VL2 to a blower/compressor unit 90 to bring the low pressure vapor up to atmospheric pressure. The blower 90 is the largest single energy consumer in our process and the main energy input to the distillation module 81.

After compression, vapor V is fed over vapor line VL3 to the distillation module rectifier 91 bottom in the usual way. The liquid reflux flowing out of the rectifier 91 bottom is directed via liquid line LL1 and a heat exchanger HE1 to a reflux stripper 92 that is much smaller (about $\frac{1}{10}$th the flow) than the ferment stripper 84. This reflux stripper 92 serves the usual stripping purpose, but because of the vapor feed to the rectifier 91, its bottoms are uncontaminated by yeast, sugar, etc., and hence, are suitable for a variety of process applications. Direct injection of live steam via steam line SL1 at the bottom of the reflux stripper 92 is used in lieu of a reboiler. The reflux stripper 92 is well insulated and is the most conventional aspect of the still in its operation.

Over half of the rectifier 91 stages, counting from the bottom, are operated with good insulation. Once the ethanol concentration in the liquid reaches a critical value, e. g. 95% of the product value, the remaining upper rectifier 91 stages are cooled, first, by a low pressure boiler, and then by process cooling water. This cooling takes place through the double-walled side walls 53 of FIG. 5a and the cooling forces vapor condensation. This condensation provides the reflux necessary for proper rectifier 91 operation, and it also greatly enriches the ethanol component of the vapor on vapor line VL4 since water condenses preferentially. Cooling and condensation are continued until all necessary rectifier reflux has been obtained. In the preferred embodiment, most of the required cooling occurs in the boiler section of the rectifier 91 but the top two rectifier stages utilize process cooling water in the cooler section 95.

This method of generating rectifier reflux differs from conventional practice wherein a portion of product (the richest ethanol liquid in the still) is used as reflux. By preferentially condensing a water rich reflux and enhancing the ethanol content of the vapor which will become product, our process increases efficiency of rectification, reduces the number of stages required, and hence reduces capital cost. A more subtle effect occurs because of cooling in the presence of an inert vapor component. At the lower temperature obtained in the top stage of the cooler section 95 of the rectifier 91 stage, the azeotrope, which limits ethanol enrichment, is shifted to higher ethanol concentration, and this further reduces the number of stages and/or allows higher enrichment.

Cooling of the rectifier 91 is provided by flowing the cooled liquid from the reflux stripper 92 bottom over liquid line LL2 in a thin film over the walls of the rectifier 91 stages. This is done at the reduced pressure of the ferment stripper 84 and results in liquid film boiling with a very high heat transfer coefficient. Not all of the ref lux stripper 92 liquid is evaporated, and the remaining water discharge from this rectifier/boiler 91 is available for other purposes to be described later.

Before use, the liquid and vapor from the rectifier 91 cooling is first passed through the co-flow equilibrator 94 at the reduced pressure of the ferment stripper 84. The liquid and vapor from the film boiling are not in equilibrium. The purpose of the equilibrator 94 is to enhance ethanol recovery by enriching the vapor at the expense of the liquid. After equilibration, the ethanol content of the liquid is about 2 parts per thousand by weight. While the equilibrator 94 is not absolutely essential for still operation, it does increase overall ethanol recovery to product and otherwise enhances still operation.

Vapor generation does not provide all necessary rectifier 91 cooling, and the top stage or two must be cooled by process cooling water in the cooler section 95 of the rectifier. The recuperation and recycle of heat from rectifier 91 to ferment stripper 84 is the largest single energy saving feature of our process and provides significant savings in energy operating cost. Almost all ethanol from the reflux stripper 92 bottoms is recovered in this process and recycled back to the ferment stripper 84 in the vapor stream via lines, VL7 and VL5.

The ethanol rich vapor flowing from the cooler section of rectifier 91 via line VL4 is chilled in the co-flow Condenser 96 to the lowest temperature available from the process cooling water. Since water tends to condense preferentially, a high quality product requires condensation to be as complete as practicable. Fortunately, as the product approaches the azeotrope in quality, the preferential condensation of water becomes less significant. Low condenser temperature, co-flow of liquid and vapor, and contactors 10 all contribute to the best possible product. Condensation occurs in the presence of a large fraction of inert vapor, a process not feasible in conventional practice.

The reality is that practical condensation temperatures leave a significant amount of ethanol in the vapor leaving the condenser 96. This ethanol is recovered in a counter-flow vent scrubber 97. Reflux for the vent scrubber 97 is provided by the almost pure water output from the equilibrator 94. Liquid from the vent scrubber 97 bottom containing the recovered ethanol is fed via line LL3 to a stage in the rectifier 91 with the nearest matching liquid composition and contributes to needed reflux in the rectifier 91.

As ethanol is scrubbed from the vapor flow in the vent scrubber 97, heat is released, and this requires some cooling of the vent scrubber 97. The vent scrubber 97, condenser 96, and top stage or two of the cooler section 95 of the rectifier 91 are all cooled by films of cooling water flowing over the walls of the contactor 10 stages of the cooler section 95 of the rectifier 91.

Vapor flowing from the vent scrubber 97 is almost entirely carbon dioxide. A portion of this flow is recycled back via line VL8 to the ferment stripper 84 bottoms (as previously described). The remainder flows to a reservoir/pressurizer 100 which serves both to maintain a slightly positive system pressure to insure exclusion of oxygen, and to compensate for variations in the rate of production of carbon dioxide during the fermentation cycle. Excess carbon dioxide from the reservoir can either be vented to the atmosphere, used to enhance production from an associated greenhouse, or processed in recovery option 101 as a byproduct (dry ice). Thus it can be seen that our still both enhances product quality and minimizes ethanol losses compared to conventional practice, and it does so with fewer stages and less net energy cost.

The Process Energy Module 82

The bottoms from the ferment stripper 84 have yet to be addressed. In conventional practice, these are often viewed as a noxious or even toxic waste product requiring expensive disposal. In our process these same bottoms are viewed as a valuable resource. Liquid flowing into the bottoms reservoir 85 holding tank is first clarified to create high-solids and low-solids fractions. The high-solids fraction may be processed to produce an animal feed byproduct, or it may be subjected to bio-digestion appropriate to its composition. The cool, low solids fraction is circulated through heat exchanger HE1 to recover heat from the reflux stripper 92.

The low-solids fraction is the most voluminous and contains the majority of potential energy components including residues of starch, sugar, and ethanol. This liquid stream on line LL4 is treated in an up flow, anaerobic, sludge blanket bio-digester 103 to produce biogas whose principal energy component is methane (70%). The biogas is pumped over line VL9 to a short term storage reservoir 104 (to smooth out variations in the energy supply and demand relationship) and then is fed over line VL10 to an internal combustion turbine or reciprocating engine 105.

The engine 105 is directly coupled to the blower/compressor 90 that compresses vapor from the ferment stripper 84. The engine 105 is also directly coupled to an electric generator (unshown) to provide all in-plant electricity requirements. The engine (or turbine) 105 exhaust is fed via exhaust line EL1 through a steam generator 106 to provide process steam for use throughout the plant, in particular, for injection over steam line SL1 into the bottom of the reflux stripper 92, for heating of the bio-digester 103, and for feedstock sterilization. Water feed for the steam generator 106 comes mainly from the discharge from the equilibrator 94 over water line WL1, but some additional water is needed for makeup (especially for feedstock sterilization) and blowdown. Additional heat for lower temperature applications can be obtained from the engine cooling water (not shown).

Provision is made for the engine 105 to operate on ethanol or on a mixture of ethanol and biogas. This feature is desirable at startup and at other times when inevitable operational problems may result in system imbalances. Even if the bio-digester 103 were to fail completely, not more than 10% of the final ethanol product would be needed to meet all energy needs of our process. This total energy requirement is far less than conventional practice.

The waste from the bio-digester 103 has lost its BOD (biological oxygen demand) and hence its noxious potential. It is also at an elevated temperature. Much of this heat is recycled through a heat exchanger HE2 to preheat the bio-digester 103 feed.

The cooled and clarified liquid waste from the bio-digester 103 is then fed via lines LL5 and LL6 to a recirculating evaporation chiller 111 to provide cooling for the vent scrubber 97, condenser 95, and upper stage or two of the rectifier 91, as previously discussed. The liquid from line LL6 passes through the evaporation chiller 111 and is cooled by evaporation caused by the counter-flow of fresh air shown in FIG. 8. This liquid then exits the evaporation chiller 111 on liquid line LL7 and is split up with portions going to the vent scrubber on liquid line LL8, the condenser, and the upper stage or two of the rectifier on liquid line LL9 where it passes in a falling film between the double walls of the stages. The cooling liquid is then collected on liquid line LL10 and brought back to the evaporation chiller 111 where the flow is merged with the flow in LL6 to be re-cooled. A portion of the returning flow is diverted on liquid line LL11 to prevent excessive accumulation of liquid in the cooling loop. This diverted flow contains concentrated nutrients and is used as fertilizer. In addition, the liquid reflux to the top of the vent scrubber 97 is precooled by passing in a falling film over the cool surface of the evaporation chiller unit 111.

Almost all energy supplied to our process either as heat or as mechanical energy is ultimately discharged through this cooling process. This evaporative cooling process consumes relatively large amounts of liquid with the result that the waste stream from the bio-digester 103 becomes concentrated. Since this concentrated stream contains all non-organic nutrients from the original feedstock, it constitutes a valuable fertilizer for return to the farmland. This feature of our process allows full renewability of the soil. It should be noted that only the high energy efficiency of our process allows all cooling to be obtained within the volume of waste liquid available.

Thus, it can be seen that in our system and process the potentially noxious waste from the fermentation bottoms is actually used to meet all energy, cooling, and fertilizer requirements—a great improvement over conventional practice with attendant cost savings.

The key features of the system of FIG. 8 are:

1. The recirculating vapor with operation of the ferment stripper 84 near the fermentation temperature. At the bottom of the ferment stripper, this vapor causes evaporative cooling of the liquid returning to the fermenter 83. This provides cooling for the fermenter 83 which saves the cost of the cooling used in conventional practice, and it also makes use of the germination heat since the cooling process creates water vapor that is needed in the stripper 84. In conventional practice, feed to the fermentation stripper must be heated to boiling at considerable energy cost. In addition, the high temperature causes unwanted chemical reactions among waste components that lead to deposits and fouling in the ferment stripper 84. These problems and energy cost are avoided by the low temperature operation.

2. Greatly reduced pressure in the ferment stripper 84. This minimizes the amount of recirculating vapor needed, and leads to much higher operating temperatures for the remainder of the still after this low pressure vapor is compressed to atmospheric pressure. The combination of pressure and temperature differences between the ferment stripper 84 and the condensation zone of rectifier 91 makes it possible to obtain all the water vapor needed by the ferment striper 84 through the cooling mechanism.

3. Heat is recycled from the cooling zone to the ferment striper 84 by boiling water at low pressure to achieve cooling, and then injecting the resulting water vapor into the ferment striper 84 where it is needed.

All this may sound like free energy, but it is not. The blower (or compressor or vacuum pump, whichever used) is an energy consumer and is the limiting feature controlling energy efficiency for this configuration. In addition, fabrication of the ferment stripper to operate under vacuum is expensive, and a potential hazard is created. If bad seals or other leaks allow air to enter the ferment stripper 84, the oxygen will be compressed along with the other vapor and will flow on to the region of high ethanol concentration at the top of the rectifier 91 where an explosive mixture might be formed.

Figure 8A:
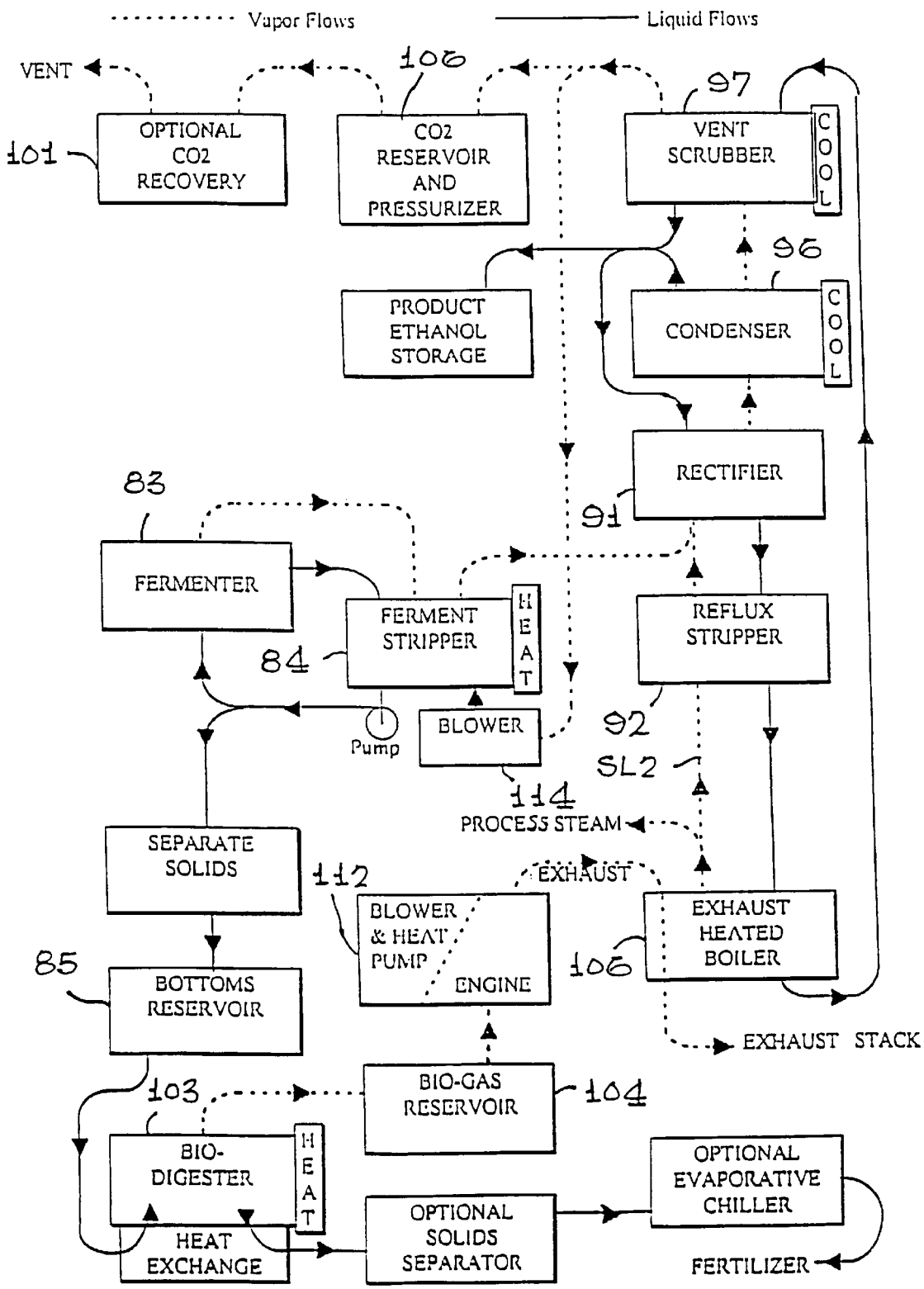
FIG. 8a is a schematic diagram of an alternate system of this invention.

The key features of FIG. 8a are:

1. The rectifying vapor loop with ferment stripper 84 temperature near that of the fermenter 83. The benefits are the same as those described for FIG. 8, feature 1.

2. Operation of the entire system at slightly above atmospheric pressure. This avoids the safety problem but at the cost of requiring most of the equipment to be larger because most of the system operates at low temperature. Recirculating vapor flow on lines VL is higher than in FIG. 8, and the vapor carries a significant amount of water vapor into the ferment stripper 84—water vapor that does not need to be generated by boiling in the ferment stripper 84. This is an important energy saving feature, but this feature conflicts with fermenter 83 cooling. For fermenter cooling, the circulating vapor entering the ferment stripper 84 should be cool and dry. To avoid the energy cost of vapor generation in the ferment stripper, the circulating vapor should be warm and wet. This requires a compromise operating condition.

3. Heat is recycled using a heat pump 112 not unlike that commonly used for heating and cooling residences. With the entire system operating at atmospheric pressure, the temperature difference between the ferment stripper 84 and the condensed product is about 20 to 25 degrees Celsius. The highest practical fermentation temperature with current technology is 40 to 45 degrees Celsius which means that the condensed product must be at 15 to 25 degrees Celsius. This is difficult to achieve reliably by evaporative cooling, especially in regions where temperature and humidity are high at least part of the year. The heat pump 112 solves the problem, and the energy to drive this pump is the limiting energy efficiency factor in this configuration.

Figure 8B:
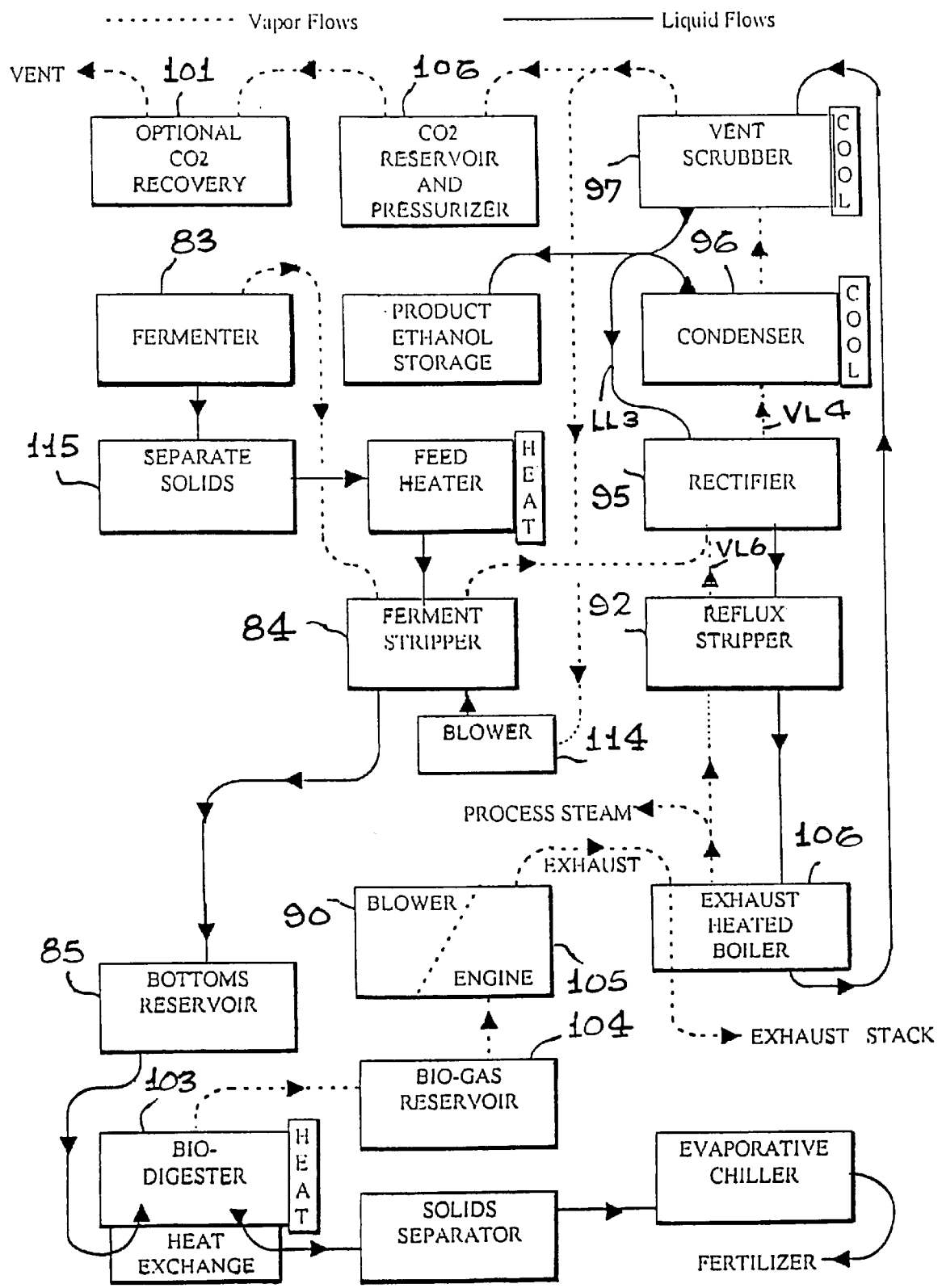
FIG. 8b is a schematic diagram of a second alternate system of this invention.

The key features of FIG. 8b are:

1. A recirculating vapor loop but with ferment stripper 84 temperature significantly higher than fermentation temperature. In this configuration, fermentation would be carried to completion as is conventional practice. The feed to the ferment stripper 84 would then be heated but not to boiling. In this way fouling can be avoided, and something less than the full feed heating cost of conventional practice is paid. Fermenter 83 heat is not utilized, and conventional fermenter cooling must be provided.

2. Operation of the entire system at slightly above atmospheric pressure. The positive pressure is a desirable safety feature since oxygen can never get into the system. Energy to drive the recirculation blower 114 is about the same as FIG. 8b and very much smaller than FIG. 8 since only a small pressure difference is required for circulation. At the higher operating temperature, equipment will be smaller and less expensive than in FIG. 8a. Since there is no recirculation back to the fermenter 83, cooling of a return flow is not essential. This means that the water vapor content of the circulating vapor can be optimized to minimize ferment stripper 84 heating without the need for any compromise. The energy savings in this configuration over that in conventional practice come from 1) this recirculation of water vapor, 2) from the reduction in feed heating, 3) from low discharge temperatures at the bottoms of the two strippers, and 4) from any recycle of heat that may be employed.

3. With the entire system operating near atmospheric pressure, the temperature difference between ferment stripper and product will be 20 to 25 degrees Celsius as in FIG. 8a. Ferment stripper temperature may be 20 degrees higher, however, and this brings the product temperature up to a level consistent with reliable evaporative cooling. Thus no energy recycle is needed, and an evaporative cooling system (as shown in some more detail in FIG. 8) will often be most economical although the heat pump arrangement of FIG. 8a can be used if desirable. The additional heat needed by the ferment stripper and by the biodigester can be supplied either by steam, hot water, or direct combustion of biogas. FIG. 8*b* represents the least departure from conventional practice that still offers some benefit from our new contactor 10.

The configuration of FIG. 8*b* would be suitable, for example, in a plant for conversion to ethanol of waste from potato processing where initial starch content in said waste is less than 15% by weight.

In all three configurations of FIGS. 8, 8*a* and 8*b*, biogas is generated and used to operate an ethanol production plant. The biogas supplies an engine to generate electricity and to provide direct any large amounts of mechanical work needed to operate such equipment as a large blower or heat pump. Steam can be generated from exhaust heat from the engine or from direct combustion of biogas. None of these aspects is particularly original with us. Our invention is an integration that we believe can make an entire plant self sufficient and independent from the usual infrastructure requirements.

All three of these new processes of FIGS. 8, 8*a* and 8*b* use a vapor loop which takes advantage of our equilibration stage that can handle the inert component (carbon dioxide). In some units we also exploit our ability to add or remove heat at individual stages. In conventional practice, heat transfer is very difficult and is avoided except in specific units such as the reboiler and the condenser.

Process and Apparatus Specifications

For any particular application of the new distillation process and contactor which we have invented, a system designer will need to specify numerous detail in order to satisfy the particular needs of the application at hand, in accordance with good chemical engineering practice. In the following specifications, fabrication, assembly and operation of all aspects of the process are in accordance with standard practice except for the particular unique features related to our contactor and its application in our novel process.

The following is a detailed description of our preferred embodiment designed to produce one gallon per minute of fuel grade ethanol 93.5% by weight from fermented mash. Multi-stage contactor units of the type shown in FIGS. 1–5 are used and connected in the system of FIG. 8.

For example, a typical system may include multi-stage contactors as follows; reflux stripper 1, rectifier 7, condenser 2 and vent scrubber 3. For a single ferment stripper 84, two units are required but in order to provide for overlapping cycles and down time for cleaning and maintenance, four sets will be needed for a total of 8 units.

The rotation rate of the central shaft 24 of contactor 10 should be 450 to 500 revolutions per minute. Liquid recirculation through pipe 40 should be at rate of 15 gallons per minute. In general, contactor units, piping and vapor ducting should be insulated to minimize unwanted condensation and/or energy loss. In the preferred implementation, the feedstock is molasses from the refining of sugar, but this choice of feedstock is by way of example and is in no way limiting.

Eight fermenters 83 of 400 gallons working capacity are utilized, working in pairs, with each pair associated with a ferment stripper 84 and with their fermentation cycles staggered to provide a relatively uniform flow of merged vapor from the ferment strippers 84 to the blower 90. Each fermenter 83 begins its cycle by the typical operations of cleanout, sterilization and loading with a solution of 30% by weight of sugar to which yeast has been added. One hour is normally allowed for these preparatory steps. Over the next 3 hours, fermentation increases ethanol concentration to 5% by weight and the fermenter 83 temperature rises to about 42 degrees C. This full fermenter 83 is next connected to its associated fermenter stripper replacing an empty fermenter. The empty fermenter is then cycled for cleanout, sterilization and loading for the next cycle. Beer (fermentation liquid) is circulated from the full fermenter through its associated ferment stripper 84 at a rate of about 6.7 gpm for three hours. Liquid is returned to the fermenter 83 at 38.4 degrees C. thereby providing necessary ferment cooling. At the end of 3 hours, virtually all sugar has been consumed. Flow of bottoms from the ferment stripper 84 continues its operation and the fermenter 83 is drained for an additional one hour. The empty fermenter is then ready to be replaced by a full fermenter.

Each ferment stripper 84 contains 8 stages fabricated as two multistage units of the type shown in FIG. 4 accept the "bottom" unit has only 3 stages instead of 5. Liquid and vapor are in counterflow at reduced pressure of $\frac{1}{7}$ atmosphere, with vapor flow at the bottom being regulated by valve RV1 at 155 CFM (cubic feet per minute) and vapor flow at the top being 672 CFM. In order to accommodate this latter flow rate, the upper, five-stage units must be scaled up to 1.5 times the dimensions shown in FIG. 4, and the rotation rate of the contactor assemblies should be reduced by the same factor of 1.5.

Merged vapor flows from the three ferment strippers 84 are compressed to a little above atmospheric pressure by the blower 90. to achieve the required compression for this preferred implementation while minimizing compression energy, three stages of compression are required. Appropriate blowers/compressors/vacuum pumps can be obtained from the Roots Division of Dresser Industries, Inc., 900 West Mount Street, Connersville, Ind. 47331. Either type RCS-J rotary positive blowers or type DVJ dry vacuum pumps are appropriate operating at 2000 rpm. The first stage of compression should be the model 721J. The second stage of compression should be the model 616J. The third stage of compression should be the model 418J. Total driving power for the three units operating in cascade is 85 hp (horsepower).

The blower 90 is driven by an internal combustion reciprocating engine 105 that also drives an electric generator. A package unit is available from U.S. Turbine Corporation, 7685 South State Route 48, Maineville, Ohio 45039 that contains the engine 105 operating on biogas and/or ethanol, the electric generator, all necessary electric switchgear and safety elements, a boiler (process steam generator) 106 heated by engine exhaust, and a geared power take off to drive the blower units. The engine required is 150 hp. The electric generator is 50 kw (kilowatt). Other components are optimized and sized appropriately by the vendor.

The bottom of the reflux stripper 92 is fed with process steam SL1 at a rate of 25 CFM or 35 pounds per hour. Reflux from the rectifier 91 into the reflux stripper 92 is at the rate of 1.1 GPM. The reflux stripper 92 has 5 stages contained in a single multi-stage unit as shown in FIG. 4 with single wall covers as shown in FIG. 5 and covered with insulation.

Vapors from the blower 90 over VL3 and the reflux stripper 92 over VL6 are merged and fed to the rectifier 91 at a rate of 310 cfm. The rectifier 95 has 35 stages. The first (lower) 25 stages are contained in 5 multi-stage units as shown in FIG. 4 with single wall covers as shown in FIG. 5 and covered with insulation. The last 10 stages are contained in two multi-stage units as shown in FIG. 4, but the covers shown in FIG. 5 have a double wall as shown in the detail FIG. 5a. The double wall 53 contains bulkheads 22 that divide said wall into chambers adjoining the various stages. These chambers are used in cooling the individual stages. Most of the stages (identified as boiler) are cooled by boiling bottoms from the reflux stripper 92 (LL2, flow rate 1.29 gpm) at reduced pressure. The last two stages (identified as cooler 95) are cooled by circulating cooling water from the evaporative chiller 111.

The vapor flow VL4 from rectifier 91 to condenser 96 is at a rate of approximately 139 cfm. The condenser 96 has 10 stages contained in two multi-stage units as shown in FIG. 4 with double wall covers as shown in FIG. 5a. The walls 53 are cooled by circulating cooling water from the evaporative chiller 111.

The vapor flow from condenser 96 to vent scrubber 97 is at a rate of approximately 79 cfm. The vent scrubber 97 has 15 stages contained in three multi-stage units as shown in FIG. 4 with double wall covers as shown in FIG. 5a. Liquid over line LL3 from the bottom of the vent scrubber 97 is fed to stage number 4 of the rectifier 91 at a rate of 0.21 gpm.

Liquid bottoms from the reflux stripper over line LL2 are partially vaporized in cooling the boiler section of the rectifier 91, and the mix of vapor VL7 and the remaining liquid are passed in co-flow to the equilibrator 94. The equilibrator 94 has 5 stages contained in a single multi-stage unit as shown in FIG. 4 with single wall covers as shown in FIG. 5 and with good insulation. The output vapor in line VL5 is then divided into 3 streams and fed to stage 4 of the three ferment strippers 84 at a rate of 387 cfm to each.

The biodigester 103 and associated reservoirs and settling tanks may be obtained as an engineered package from TerraFuels, Inc. 420 South Third Avenue, Lombard, Ill. 60148. Liquid feed is at the rate of up to 6 gpm with an average flow of 5 gpm. The COD (chemical oxygen demand) of the biodigester feed is 41 kilograms per cubic meter per day.

Clarified effluent from the biodigester 103 is fed to the evaporative chiller 111 for concentration and process cooling. The evaporative chiller 111 has 5 stages contained in one multi-stage unit as shown in FIG. 4 with double wall covers as shown in FIG. 5a. The chilled liquid from the evaporative chiller 111 is recirculated to the vent scrubber 97, the condenser 96, and the cooler 95 of the rectifier.

Additional tanks, reservoirs, pipes, valves, pumps, ducting, and other plant components are those commonly used in the chemical industry.

Although the description above contains many specificities, these should not be construed as limiting the scope of the invention but merely as providing illustrations of some of the presently preferred embodiments of this invention. Experienced designers will see may possibilities for variations to meet particular performance goals, cost objectives, or fabrication opportunities. For example, the hardware design of the contactor is most suited to small volume production for which specialized tooling and processes may not be economical. For large volume production, heat exchange surfaces FIG. 5a could be fabricated by conventional roll bonding and hydraulic expansion as is common in refrigeration. Some components could be molded from plastic. An individual remixing cylinder 29 could be formed from a single, full width sheet with punched slots rather than from assembly of bands; and slots could be oriented parallel to the drive shaft 24 rather than circumferentially. The remixing cylinders could be molded from plastic or they could be made from screen or from screen modified by appropriately located opaque patches. Rather than a plurality of remixing cylinders, a single, full width screen or slotted strip of suitable length could be wound in a spiral with appropriate spacing between turns. The separately powered recirculation pump 42 could be replaced by an Archimedes spiral pump on the same shaft 24 as the rotating contactor assembly. The demisting screens 35 could be replaced by a multitude of radial filaments with less propensity for fouling. Rather than the forced transfer of liquid T between stages in a multi-stage unit, said unit could be mounted on a slight incline with liquid moving in a self regulating flow under gravity over small dams between stages.

Thus the scope of the invention should be determined not by the examples given, but rather by the appended claims and their legal equivalents.

It is claimed:

1. A rotating contacting device for producing interaction between liquid and vapor phases introduced into said device comprising:

a housing including openings therein for introducing liquid phase and vapor phases into said housing and for removing said phases;

rotatable means with an axis of rotation within said housing including a remixing section for the interaction of said liquid and vapor phases;

said rotatable means having a hub for intercepting said liquid phase introduced into said housing and for producing an axial and circumferential distribution of drops of said liquid phase in centrifugally induced radial outward flow from said hub; and said remixing section including liquid flow remixing means with a plurality of overlapping obstructions and openings providing staggered partial barriers disposed axially, circumferentially and radially surrounding said hub on said rotatable means to interrupt repeatedly the otherwise free flight of said liquid phase and to provide rain-like radial flow of new liquid drops with refreshed surfaces throughout said remixing section;

said re-mixing section defining paths for vapor phase passage through said housing wherein said vapor phase paths include multiple intersections with the radial flow of free flying liquid phase drops within said housing for enhanced interaction between said phases.

2. Apparatus in accordance with claim 1 constituting a single stage wherein a plurality of said stages are joined in series to produce a multi-stage unit;

wherein said plurality of stages are contained within a common housing and are mounted on a common axis to be driven by a common source of rotation;

including fluid conducting means which connects said plurality of stages for conducting the flow of liquid phase and vapor phase between stages.

3. A rotating contacting device in accordance with claim 1 wherein said remixing section comprises a plurality of sets of coaxial staggered remixing cylinders, each including a number of tubular bands having openings therebetween and longitudinally spaced from each other so as repeatedly to interrupt and reform the radial flow of the liquid phase.

4. A rotating contactor in accordance with claim 3 wherein said tubular bands include a central portion for intercepting radial liquid flow and lips at each edge for launching separate flows of liquid phase after interruption of radial flow to produce new radial flows of the liquid phase from said lips.

5. A rotating contacting device in accordance with claim 1 including sump means for collecting liquid phase having passed through the vapor phase.

6. A rotating contacting device in accordance with claim 5 including means for recirculating the collected liquid phase from said sump means through said liquid phase introducing opening of said housing for repeated interaction with the vapor phase.

7. Apparatus in accordance with claim 1 wherein said housing includes an outer wall and an inner liquid phase and vapor phase containing wall; and means for introducing and circulating a heat transferring medium between said walls for temperature control of said liquid and vapor phases in said apparatus.

8. A rotating contacting device in accordance with claim 1 including means for collecting the vapor phase after interaction with the liquid phase.

9. A rotating contacting device in accordance with claim 8 wherein said vapor collecting means includes demisting means.

10. A rotating contactor in accordance with claim 3 wherein said bands define a liquid phase flow path on the inner side thereof with respect to said axis of rotation and includes lips at opposite edge surfaces thereof for simultaneously launching the liquid phase from each edge thereof for intersection with the vapor phase introduced into said housing and co-flowing with said liquid phase.

11. A rotating liquid and vapor phase mixture contacting device comprising:
   a housing defining an axis of rotation for said contacting device;
   a first conduit coupled to said housing for introducing one phase into said housing, said first conduit being rotatable about said axis of rotation in said housing;
   said housing including a second conduit for introducing the second phase into said housing in the region of said first conduit for co-flow within said housing with said first phase;
   said rotatable first conduit including a plurality of circumferentially and longitudinally positioned openings for distributing said one phase within said housing and for centrifugally dispersing said one phase as numerous streams of freshly formed drops within said housing;
   a plurality of radially and longitudinally displaced surfaces supported within said housing for rotation with said rotatable means and intercepting and redistributing the drops of said one phase dispersed from said rotatable first conduit;
   said radially displaced surfaces forming a radially spaced and longitudinally staggered array with respect to the axis of rotation of said conduit;
   said radially displaced surfaces further defining a path for said second phase for co-flow with said first phase through said housing whereby the second phase intercepts said first phase as it is dispersed from said radially displaced surfaces.

12. A rotating contacting device in accordance with claim 11 wherein:
   said radially displaced surfaces each include a pair of opposite edges;
   from which said one phase is dispersed centrifugally off of each said pair of opposite edges.

13. A rotating contacting device in accordance with claim 12 wherein said first phase is liquid and said second phase is vapor.

14. A rotating contacting device in accordance with claim 11 wherein the flow path for the second phase upon introduction into said housing is generally parallel to the axes of rotation of said first conduit and outside thereof and within said array of surfaces; said surfaces defining a plurality of generally radially flowing intersecting paths for co-flow of said first and second phases.

15. A rotating contacting device in accordance with claim 11 including means within said housing for collecting the liquid phase which passes beyond the array of surfaces.

16. A rotating contacting device in accordance with claim 15 including means for returning the first phase collected in said collecting means beyond said array of surfaces to said rotatable first conduit.

17. A mechanically assisted two-phase contactor apparatus for interacting flowing liquid and vapor phases of a liquid mixture comprising:
   a housing;
   means within said housing for introducing a liquid phase and a vapor phase for co-flow therethrough;
   means for producing centrifugal force induced outward flow of said liquid phase within said housing;
   means for repeatedly interrupting the outward flow of said liquid phase;
   said interrupting means including a plurality of sets of coaxial remixing cylinders each including tubular bands having openings therebetween and longitudinally spaced from each other;
   said interrupting means constituting means for generating, collecting, and free flying release of the liquid phase;
   said interrupting means defining a path for intimately contacting said free flying liquid phase with the flowing vapor phase within said housing; and
   means for collecting the liquid phase after contact with said vapor phase.

18. The apparatus of claim 17 including means for recirculating at least one phase independent of the net throughout of said contactor apparatus of either of the two phases.

19. The apparatus of claim 17 wherein heat exchanging means is provided for said recirculating phase in said recirculating means.

20. The apparatus of claim 19 wherein said heat exchange means includes a wall of said housing.

21. The apparatus of claim 17 including means for removing mist from the vapor after contact of said liquid phase and vapor phase within said housing.

22. The apparatus of claim 17 wherein said outward flow producing means comprises a rotating body having an axis of rotation within said housing having a liquid phase distribution hub surrounded said tubular bands within said housing serving to repeatedly receiving launch and reform said liquid phase for interaction with the moving vapor phase and means for introducing the vapor phase for flow through said housing generally parallel to said axis of rotation prior to co-flow of the vapor phase outward with the liquid phase.

23. The apparatus of claim 17 wherein a plurality of said apparatus are joined in series to produce a multi-stage unit;
   wherein each of said plurality of apparatus including double walled sidewalls for independent stage to stage temperature control.

24. The apparatus of claim 23 wherein means said housing means includes an outer wall and an inner liquid phase and vapor phase containing wall for each stage and includes means for introducing a heat transferring medium between said walls of said apparatus for each stage.

25. A system for the production of fuel ethanol from a mash comprising:
   a fermentation module;
   wherein said fermentation module comprises a fermenter producing a liquid phase and a vapor phase and a ferment stripper and wherein, during fermentation, mash is circulated through the ferment stripper to remove ethanol as it is produced thereby maintaining a low ethanol concentration throughout the fermentation cycle;

means for diverting mash residue from fermentation to a reservoir; and means for introducing the liquid phase and vapor phase output from said fermenter into said ferment stripper;

wherein said ferment stripper comprises:

a rotating contactor for producing interaction between liquid and vapor phases of the liquid mixture introduced into said device including:

a housing including a pair of entrance openings therein for introducing a liquid phase and a vapor phase into said housing;

rotatable means with an axis of rotation within said housing intercepting the liquid phase in the region of said axis of rotation for providing centrifugally induced radial flow of the liquid phase introduced into said housing; and a remixing section defining a path for vapor phase passage through said housing with the liquid phase wherein said path includes concentric axially and circumferentially staggered obstructions and openings on said contactor defining multiple intersections of the vapor phase with the radial flow of liquid phase drops within said housing for enhanced interaction between said phases; and outlet means for said liquid phase after interaction with said vapor phase.

26. In a system in accordance with claim 25 including a rectifier coupled to said ferment stripper and including low pressure boiler for cooling vapor from said ferment stripper.

27. A system in accordance with claim 25 wherein at least some of the stages of said rotating contactor has housings with double walls; and including a source of cooling water coupled to said rotating contactor to flow cooling water through the double walls of said contactor for preferential condensation of water from said vapor.

28. In a system for the production of fuel ethanol from a mash in accordance with claim 25 including:

a rectifier coupled to said ferment stripper to receive the output thereof;

a condenser coupled to said rectifier;

means for removing condensed ethanol coupled to said condenser;

a vent scrubber coupled to said condenser for removing residual ethanol in the vapor from said condenser;

said vent scrubber comprising:

a rotating contacting device for producing interaction between liquid and vapor phases of the liquid mixture introduced into said device comprising:

a housing including entrance openings therein for introducing liquid phase and vapor phases into said housing;

rotatable means with an axis of rotation within said housing intercepting the liquid phase of a liquid mixture in the region of said axis of rotation for providing centrifugally induced radial flow of liquid phases introduced into said housing; and means defining a path for vapor phase passage with said liquid phase through said housing wherein said vapor phase path includes multiple intersections with the radial flow of liquid phase drops within said housing for enhanced interaction between said phases.

29. In a system in accordance with claim 28, the combination wherein said ferment stripper employing a plurality of rotating contactors constituting a number of stages and including means for maintaining a predetermined stage to stage temperature profile with the coldest stage at the final liquid exit from said ferment stripper.

30. A system in accordance with claim 29 including a vapor line from said fermenter through a pressure reducer to said ferment stripper.

31. In a system in accordance with claim 29 including a blower wherein the stage to stage temperature relationship is maintained by cooling at least one stage by said blower.

32. In a system in accordance with claim 29 wherein a plurality of blowers are provided between stages of rotating contactors to provide progressively increasing pressure to succeeding stages.

33. In a system in accordance with claim 29 including a distillation module including a vent scrubber and including vapor recirculation means wherein the maintaining of the stage to stage temperature relationship is maintained by said recirculation means of vapor from said vent scrubber of said distillation module to said ferment scrubber.

34. In a system in accordance with claim 30 including means for maintaining said ferment stripper at an operating pressure in the range of 100 to 130 mm mercury.

35. In a system in accordance with claim 30 including means for maintaining said ferment stripper at an operating temperature of 30 to 50 degrees centigrade.

36. In a system for the production of fuel ethanol from a mash including:

a distillation module;

said distillation module including a rectifier comprising a plurality of contactors each comprising:

a rotating contacting device for producing interaction between liquid and vapor phases of the liquid mixture introduced into said device comprising:

a housing including entrance openings therein for introducing liquid phase and vapor phases into said housing;

rotatable means with an axis of rotation within said housing intercepting the liquid phase of a liquid mixture in the region of said axis of rotation for providing centrifugally induced radial flow of liquid phases introduced into said housing; and a remixing section defining a path for vapor phase co-flow passage with the liquid phase through said housing wherein said vapor phase path includes multiple intersections with the radial flow of liquid phase within said housing for enhanced interaction between said phases;

said re-mixing section defining paths for vapor phase passage through said housing wherein said vapor phase paths include multiple intersections with the radial flow of free flying liquid phase drops within said housing for enhanced interaction between said phases;

said remixing section including liquid flow remixing means with a plurality of overlapping openings and obstructions providing partial barriers disposed axially, circumferentially and radially surrounding said hub on said rotatable means to interrupt repeatedly the otherwise free flight of said liquid phase and to provide rain-like radial flow of liquid drops with refreshed surfaces throughout said remixing section.

37. In a system in accordance with claim 36 wherein said distillation module includes a ferment stripper and wherein a portion of the ferment stripper vapor flow is provided by the injection into said ferment stripper of vapor generated in said rectifier.

38. In a system for producing fuel ethanol from a water containing mash including a distillation module producing liquid and vapor containing ethanol as well as high and low solids from mash and a process energy recovery module, the improvement thereon comprising:
- a reservoir for receiving high solids and low solids fractions from said distillations module;
- an up-flow anaerobic sludge blanket bio-digester coupled to said reservoir for production of bio-gas comprising mainly methane;
- an internal combustion engine coupled to receive and operate with the bio-gas from said bio-digester;
- means for compressing ethanol containing vapor from said distillation module;
- a steam generator;
- means conducting the exhaust from said internal combustion engine to supply heat energy to said steam generator;
- and means conducting water from said distillation module to said steam generator for supplying feed water for steam production by said steam generator.

39. In a system in accordance with 38 including means coupling of the ethanol output of said distillation module to said internal combustion engine for providing fuel for said engine.

40. A system for condensing, rectifying and concentrating distillate from a fermenter comprising:
- a ferment stripper coupled to receive the output from a fermenter;
- means for introducing heat into said ferment stripper;
- blower means for introducing vapor phase from said fermenter into said ferment stripper;
- a plurality of stages of contactor means within said ferment stripper for interacting said feed and the vapor phase means for maintaining at least one of said stages in adiabatic condition;
- means for removing bottoms from said ferment stripper;
- a rectifier connected to receive vapor phase flow from said ferment stripper;
- means within said rectifier for forming reflux, said last means including means for removing heat from said rectifier;
- a condenser coupled to receive vapor phase from said rectifier;
- means for removing heat from said condenser;
- means for extracting concentrated distillate from said condenser;
- a vent scrubber;
- means for removing heat from said vent scrubber;
- means for recirculating vapor phase from said vent scrubber to said stripper; and
- means for refluxing liquid phase from said vent scrubber to said rectifier.

41. The method for producing ethanol from a mash comprising the steps of:
- introducing a mash into a fermenter for fermentation;
- introducing the liquid phase and vapor phase of the output of fermentation into a ferment stripper;
- within said ferment stripper centrifugally distributing the liquid phase of the output of fermentation into drops by impingement upon rotating staggered surfaces to reform new drops as each rotating staggered surface is encountered;
- passing the vapor phase in co-flow relationship with the liquid phase through said ferment stripper for repeated contact with the drops and reform new drops to provide interaction between the liquid and vapor phases;
- rectifying the resultant vapor in the presence of an inert vapor; and
- condensing the resulting vapor into concentrated ethanol.

42. The method in accordance with claim 41 including the step of introducing the residual vapors from condensation into a vent scrubber.

43. The method in accordance with claim 41 including the step of introducing vapor from said vent scrubber into said ferment stripper.

44. The method in accordance with claim 41 wherein at least the first step of rectification is performed under adiabatic conditions.

45. The method in accordance with claim 41 including the steps of cooling the residual vapor after condensation in a vent scrubber and refluxing the resultant liquid for rectification.

46. The method for producing ethanol from a source of feed stock comprising the steps of:
- fermenting feed stock;
- distilling the resultant products of fermentation;
- condensing the resulting products of distillation;
- wherein at least one of the distillation or condensing steps is performed by:
  - introducing liquid and vapor phases into a housing in which the liquid phase is centrifugally distributed into drops by impingement upon rotating staggered concentric surfaces to reform new drops as each rotating surface is encountered; and
  - by passing the vapor stage through said housing in a path for repeated contact with the drops and reformed drops to provide interaction between the liquid and vapor phases.

47. A rotating contacting device for producing interaction between liquid and vapor phases of a liquid mixture introduced into said device comprising:
- a housing including entrance openings therein for introducing liquid phase and vapor phases into said housing;
- rotatable means with an axis of rotation within said housing intercepting the liquid phase of a liquid mixture for providing centrifugally induced radial flow of liquid phases introduced into said housing;
- both said vapor phase introducing opening and said liquid phase introducing opening positioned in the region of said axis of rotation for introduction into said contactor for co-flow of liquid and vapor phase outward from the region of said axis of rotation upon rotation of said rotating contactor device;
- includes liquid flow interrupting means on said rotatable means;
- said interrupting means comprising a plurality of sets of coaxial staggered remixing cylinders each including tubular bands having openings therebetween and longitudinally spaced from each other;
- said interrupting means thereby defining a path for vapor phase passage through said housing wherein said vapor phase path includes multiple intersections with the radial flow of liquid phase within said housing for enhanced interaction between said phases.

* * * * *